Dec. 12, 1939.  G. G. MORENO  2,182,993
PRISMATIC SCREEN
Filed July 31, 1936
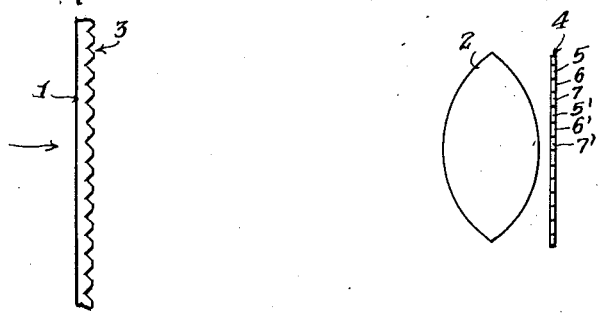
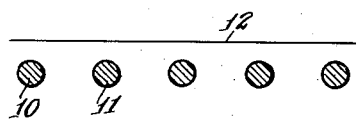
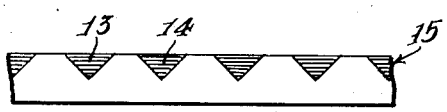
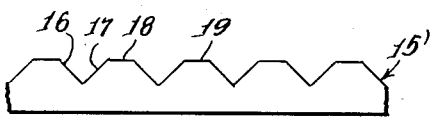
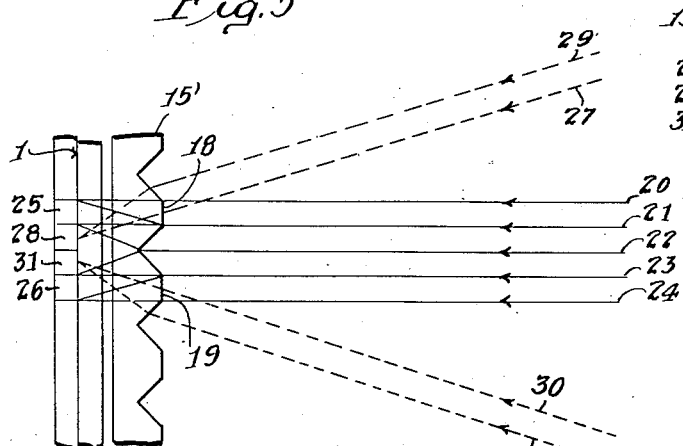
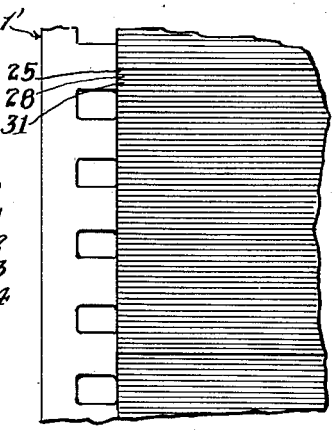
INVENTOR.
Gabriel Garcia Moreno
BY Lyon & Lyon
ATTORNEYS Patented Dec. 12, 1939

2,182,993

UNITED STATES PATENT OFFICE 2,182,993

PRISMATIC SCREEN

Gabriel Garcia Moreno, Los Angeles, Calif., assignor to C M C Corporation, New York, N. Y., a corporation of Delaware Application July 31, 1936, Serial No. 93,627

2 Claims. (Cl. 95—81)

This invention primarily relates to prismatic screens and methods of their production, such screens being particularly adapted for use in photography in colors by the additive process.

In the past, and as particularly described in a French Patent No. 603,397 published in 1926, a method has been described in which a lined screen was placed in front of a sensitive emulsion. This screen was composed of lines which were alternately opaque and transparent. The opaque portions were preferably about twice the width of the transparent portions. The objective lens was focused on the sensitive emulsion and three light filters of substantially complementary value were placed in the objective lens preferably at the optical center of the lens. In view of the fact that approximately two-thirds of the total area of the emulsion was blocked off by the opaque lines, the exposed film was composed of bands differing in color value which were obtained in the following manner: Parallel light passed directly through the transparent spaces but like parallel lines only passed through the centrally positioned color code. Light passing through the upper color filter (of a series of three) impinged upon the emulsion through the transparent slot at an angle so as to form an exposure band on the emulsion of another color value. Light passing through the third color filter was oppositely inclined in passing through the transparent slot and thus produced a third band on the emulsion.

During projection the direction of the light was substantially reversed but all of the elements, including film, semitransparent screen, and color filters, were used. This process, however, is not commercially usable, since the grooved screen transmits only about 40% of the total light. This necessitates the use of extremely intense illumination on the objective field, and the concurrent use of extremely fast lenses. Extremely intense illumination must be used during the projection. Moreover, it is impossible to employ the normal diaphragms in the camera but instead it is necessary to use certain types since otherwise an equal distribution of light from all three color filters cannot be obtained.

The present invention may be said to be somewhat related to the hereinabove described process, but is readily distinguishable therefrom in that no use is made of a ruled screen having opaque lines or portions.

Generally stated, the present invention is directed to a method of photography whereby a prismatic screen is formed and is positioned in front of the sensitive emulsion, the screen being spaced from such emulsion. The objective lens is then provided with a plurality of sets of virtually complementary filters. By reason of the prismatic screen the negative which is obtained carries a plurality of parallel closely adjacent bands in sets of three, each band of a set bearing a record of different color values. The present invention is directed also to a method of obtaining and producing a prismatic screen of the character described, such screen having a very high overall transmission of light.

The invention is also directed to a method of projecting and exhibiting photographic records, such as motion pictures, by the additive process employing in such propection process a prismatic screen of the character referred to hereinabove.

A further object is to disclose and provide a method of preparing prismatic screens in a ready and efficient manner.

A further object is to disclose and provide a prismatic screen capable of being employed in motion picture photography and projection which screen transmits more than 75% of the light supplied thereto.

Another object of the invention is to disclose and provide various means and combinations of elements whereby the methods of the invention may be carried out in an effective manner.

Other objects, uses, advantages, modifications and adaptations of the invention will become apparent to those skilled in the art from the following detailed description of the preferred methods and means coming within the purview hereof. For purposes of illustration, and in order to facilitate understanding, reference will be had to the appended drawing, in which Figure 1 diagrammatically represents an arrangement of elements which may be used during the photographing or projection in accordance with the method of this invention.

Figures 2, 3 and 4 represent various steps in the production of a prismatic screen; Fig. 2 diagrammatically represents a transverse section through a portion of an object to be photographed; Fig. 3 represents the exposed and developed negative produced by photographing the object in Fig. 2, and Fig. 4 represents the treated negative or prismatic screen.

Figure 5 diagrammatically illustrates a transverse section of relationship between a sensitive emulsion, a prismatic screen, an objective lens, and light filters during photography.

Figure 6 is a plan view of a portion of a motion picture film made in accordance with the method of this invention.

By referring to the drawing, and particularly to Figs. 1 and 5 thereof, it will be seen that during photography (or projection) an emulsion or film 1 is placed in operative relationship with respect to a lens system 2. A prismatic screen 3 is placed between the film 1 and the lens 2 and is preferably slightly spaced from the film 1. Either within the lens 2 or immediately in front thereof, a plurality of sets of light filters are positioned. The entire arrangement of light filters is indicated at 4 and the numerals 5, 6 and 7 represent three light filters which comprise a set, such set being then followed by another identified by the numerals 5', 6' and 7'. During projection, light is applied in the direction of the arrow and the effect upon the projection screen is that of a photograph or motion picture in substantially natural colors.

The prismatic screen 3 referred to hereinabove may be made in a number of different ways but the following has been found to be extremely simple and satisfactory. A plurality of wires or other substantially black non-actinic members are fastened in a frame or otherwise held in parallel spaced relation. Fig. 2 shows wires 10, 11, etc., in section and in parallel spaced relationship in front of a white or actinic background 12. The wires 10 and 11 are spaced a distance equal to twice the diameter of each wire. This arrangement has been photographed and Fig. 3 represents an enlarged cross-section of a negative thus obtained.

During photography, however, it is desirable to over-expose and as a result the exposed areas 13 and 14 have their edges closer to one another and closer than the diameters of the non-actinic wires 10 and 11. The exposed silver of the emulsion carried by the negative 15 will taper downwardly so that the exposed areas in cross-section will be relatively wide at the top and narrow at the bottom, as shown in this figure. This negative is then developed, and during the development only those developers that attack the top surface of the film first should be employed. Developers such as amidol should not be employed. Under-development should be the object of this operation so that after such under-development the film may be subjected to a gelatin hardening process (as by the use of ammonium bichromate and potassium bromide) and a silver bleaching or developing solution (such as, for example, sulfuric acid), before being subjected to treatment with hypo. The resulting film is then shown in Fig. 4 and identified as 15'. This film comprises a prismatic screen and it will be seen that it is a gelatin relief provided with parallel grooves each of the grooves having substantially flat opposing faces, such as 16 and 17, separated from the adjoining groove by flat plane faces 18 and 19. These flat plane faces 18 and 19 are separated by a distance which is substantially twice the width of each of the planes 18 or 19.

Those skilled in the art will observe that the object and the result attained is a relief carried by the gelatin of a film, such relief consisting of parallel flat planes spaced by V-shaped grooves having a maximum width of approximately twice the width of the planes. This result can obviously be obtained by a large number of bichromate and other gelatin hardening processes, but the method specifically described has been found to be rapid, easily controlled, and capable of producing uniformly successful results.

The prismatic screen 15' carries no opaque silver or other material capable of preventing the passage of light. As a result, the prismatic screen 15' is capable of transmitting well over 75% of total light supplied thereto and in most cases will transmit approximately 90 to 95% of the light.

During the photography, the prismatic screen 15' is placed in spaced relation to the sensitive emulsion 1, as shown in detail in Fig. 5. It will be observed that all substantially parallel rays, such as the rays between 20 and 21 and 23 and 24, will pass directly through the flat portions 18 and 19 and record within the emulsion of film 1. A similar parallel ray, such as the beam formed between rays 21 and 22, will be prismatically deflected by the inclined face of the screen 15' to again fall upon the same area 25 as that affected by the beam 20—21. The bundle of light rays between 22 and 23 impinges upon the opposing inclined face on the screen 15' and is deflected upon the area 26. All parallel beams, therefore, will form spaced image bands such as 25 and 26.

Rays which reach the screen 15' at an angle will produce image bands between areas 25 and 26 on the emulsion. For example, the ray 27, passing through the plane 18 will impinge in the center of the area 28. A parallel beam 29, impinging upon an adjoining inclined face of the screen 15' will be deflected by said inclined face and fall upon the area 28 likewise. An oppositely inclined beam of light, such as beam 30, as indicated at 32, will be deflected by the inclined face of the prismatic screen 15' and also fall in superimposed relation upon the area 31. It is to be noted that angularly related beams, such as 29, 21 and 30, will form three distinct images or image bands 25, 28 and 31.

These angularly related rays are focused upon the film 1 by means of the lens 2. Immediately in front of such lens (or immediately in back thereof), there is positioned a plurality of sets of light filters, such as the light filters 5, 6 and 7. If we treat the lens 2 as simply a multiplicity of pinhole cameras, it will be noted that in practically all instances we can treat the paraxial light as passing through the intermediate light filter 6, the downwardly inclined beams, such as 27 and 29 as passing through the light filter 5, and the upwardly directed beams, such as 30 and 32, as passing through the light filter 7. As a result, the areas 25, 28 and 31 are image bands of different color values, the color values being imparted to said bands by the light filters 5, 6 and 7.

In actual practice it has been found that when the top of the screen 15' is spaced 0.018 inch from the surface of the emulsion facing the screen and the prismatic screen itself is 0.001 inch in depth, the width of the flats 18 and 19 being 0.001 and the distance separating the flats being 0.002 inch, the width of the image bands formed on the emulsion 1 will be about 0.001 inch. Under such conditions and using a lens having a 3-inch focal length, each one of the light filters 5, 6 and 7 is preferably 0.180 inch wide, the entire set of three being 0.540 inch wide. Four or six sets may have to be used. These measurements contemplate placing the light filters as close to the front face of the objective lens as is possible. Obviously the width of each of the light filters can be increased when they are spaced further from the lens. An attempt should be made, however, to keep these color filters in a plane lying as close to the front face of the lens as possible. When lenses of different focal length are employed, it may be necessary to change the width of the light filters 5, 6 and 7. In computing this width, it may be well to remember that it has been found proper to use multiples of 0.06 inch for the width of each of these light filters, the unit 0.06 being the unit width every 1-inch focal length of the lens system. When using a lens having a 10-inch focal length, therefore, each of the light filters may be 0.6 inch wide.

The exact spacing of the prismatic screen from the sensitive emulsion will of course depend somewhat upon the angulation of the opposing faces in such screen. The width of each of the light filters employed will be influenced somewhat by the characteristics of the prismatic screen, such as the width of the flats and the spacing therebetween.

Those skilled in the art will be able to readily compute the conditions which need be met from a consideration of the description given herein, since only mathematical and optical relationships exist.

In the method of photography described, it is to be noted that an ordinary diaphragm may be employed in the lens system 2, since a plurality of sets of light filters are employed and the ordinary circular type of diaphragm will always include three or more of these bands, thereby producing a rather well balanced relationship between the color values, irrespective of diaphragm opening.

The image film procured in accordance with this invention bears a multitude of parallel image areas or bands, these bands occurring in sets of three, each set representing three different color values. As shown in the enlarged, fragmentary view (Fig. 6), the developed film 1' will contain bands such as 25, 28 and 31 extending thereacross. The normal motion picture frame is 0.825 inch wide and when the specific prismatic screen and spacing described hereinabove is employed, there are approximately 333 narrow image bands extending across each frame.

It is to be remembered that the light filters 5, 6 and 7 parallel the flats and prism faces of the prismatic screen 15'. These flats and prism faces need not be horizontal, however. They can either be positioned transversely of the film 1, longitudinally thereof, or at an angle between these limits. The light filters 5, 6 and 7 should likewise be positioned at a corresponding angle.

During photography the prismatic screen 15' may be stationary and the film 1 may intermittently advance in the normal manner. During the projection, however, the print, such as the print of Fig. 6, may be made on double coated stock and the opposed face of such double coated stock may be provided with a prismatic screen of the character described, the Celluloid base of carrier of this film furnishing the necessary spacing between the image bands and the prismatic screen. During the projection, the image bands should face the source of light so that the rays travel along the paths indicated in Fig. 5 but necessarily in the opposite direction.

As has been mentioned hereinbefore, the width of the sets of the three light filters used is governed in accordance with the focal length of the objective lens being employed. Instead of changing from one set of color filters to another with variations in focal length of lenses during photography, it is possible to employ the same set of color filters provided, however, compensating lenses are introduced into the system for the purpose of converting such lenses into those for which the specific group of color filters is adapted. If, for example, a 3-inch lens has been used and the color filters are of a width adapted for use with a 3-inch lens, and it is then desired to use a 5-inch lens, a compensating lens can be inserted into the system for the purpose of converting the 5-inch lens into an effective 3-inch lens as far as the angularity of the rays through the color filters is concerned.

I claim:

1. A method of producing a prismatic screen adapted for use in additive photography, which comprises: making a photographic record of an object composed of actinic and non-actinic parallel lines, the actinic lines having a width more than equal to but not materially exceeding twice the width of the non-actinic lines, developing said photographic record to form a graded image of all actinic lines, hardening the gelatin of said photographic record and bleaching said record to remove said images and associated gelatin to form a prismatic relief consisting of a plurality of parallel spaced flat faces separated by V-shaped depressions having flat oppositely inclined opposing faces, said resulting screen being capable of transmitting more than 75% of light supplied thereto.

2. A method of producing a prismatic screen adapted for use in additive photography, which comprises: making a photographic record of an object composed of actinic and non-actinic parallel lines, the actinic lines having a width more than equal to but not materially exceeding twice the width of the non-actinic lines, over-exposing said photographic record during its formation, under-developing said photographic record to form a graded silver image of all actinic lines, hardening the gelatin of said photographic record, and removing the exposed silver and associated gelatine therefrom to form a prismatic relief, consisting of a plurality of parallel spaced flat faces separated by V-shaped depressions having flat, oppositely inclined opposing faces.

GABRIEL GARCIA MORENO.